US 7,725,707 B2

(12) United States Patent
Yamada et al.

(10) Patent No.: US 7,725,707 B2
(45) Date of Patent: May 25, 2010

(54) SERVER, VPN CLIENT, VPN SYSTEM, AND SOFTWARE

(75) Inventors: Mariko Yamada, Tokyo (JP); Masashi Yano, Kawasaki (JP); Makoto Arai, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 984 days.

(21) Appl. No.: 11/047,772

(22) Filed: Feb. 2, 2005

(65) Prior Publication Data
US 2006/0070115 A1    Mar. 30, 2006

(30) Foreign Application Priority Data
Sep. 29, 2004   (JP)   ............... 2004-083021

(51) Int. Cl.
*H04L 9/00* (2006.01)
(52) U.S. Cl. ...................... 713/150; 713/153
(58) Field of Classification Search ................. 713/151, 713/153, 154, 162, 163, 168; 709/223, 225, 709/229
See application file for complete search history.

(56) References Cited

U.S. PATENT DOCUMENTS

| | | | | |
|---|---|---|---|---|
| 6,567,929 | B1 * | 5/2003 | Bhagavath et al. | ............ 714/18 |
| 6,870,842 | B1 * | 3/2005 | Caronni et al. | ............... 370/390 |
| 7,310,730 | B1 * | 12/2007 | Champagne et al. | ........ 713/163 |
| 2004/0030804 | A1 * | 2/2004 | Wiget et al. | ................. 709/245 |
| 2005/0138369 | A1 * | 6/2005 | Lebovitz et al. | ............. 713/163 |
| 2006/0059370 | A1 * | 3/2006 | Asnis et al. | ................. 713/189 |

OTHER PUBLICATIONS

S. Kent et al., "Security Architecture for the Internet Protocol", Network Working Group, Standards Track (Nov. 1998), pp. 1-66.
Office Action from the Japanese Patent Office, dated Jun. 9, 2009.
Rosen, Eric C. (Editor), Cai, Yigun (Editor), and IJsbrand Wijnands, "Multicast in MPLS/BGP IP VPNs", Network Working Group, Internet Draft, draft-rosen-vpn-mcast-07.txt, dated May 2004, pp. 1-21.
Ooms, Dirk and De Clercq, Jeremy, "Overview of Multicast in VPNs", Internet Draft, draft-ooms-ppvpn-mcast-overview-00.txt, dated Feb. 2002, pp. 1-15.

* cited by examiner

*Primary Examiner*—Beemnet W Dada
(74) *Attorney, Agent, or Firm*—Stites & Harbison PLLC; Juan Carlos A. Marquez, Esq.

(57) ABSTRACT

When forming an L2VPN, each VPN server is required to decrypt data received from a VPN client using the source VPN client key and encrypt the data using the destination VPN client key. The loads of the encrypting and decrypting processings are high, thereby the VPN server through-put is lowered.

In order to solve the above problem, according to the present invention, the destination address of an IP packet sent from the VPN client is used as a multicast address, then data is encrypted according to the security association of the multicast address distributed from the VPN server. The encrypted IP packet is encapsulated with the IP address of the VPN server and sent to the VPN server. Receiving this IP packet, the VPN server determines the destination VPN client according to the multicast address of the encapsulated IP packet, then encapsulated with the IP address of the destination VPN client and sent to the VPN client.

5 Claims, 22 Drawing Sheets

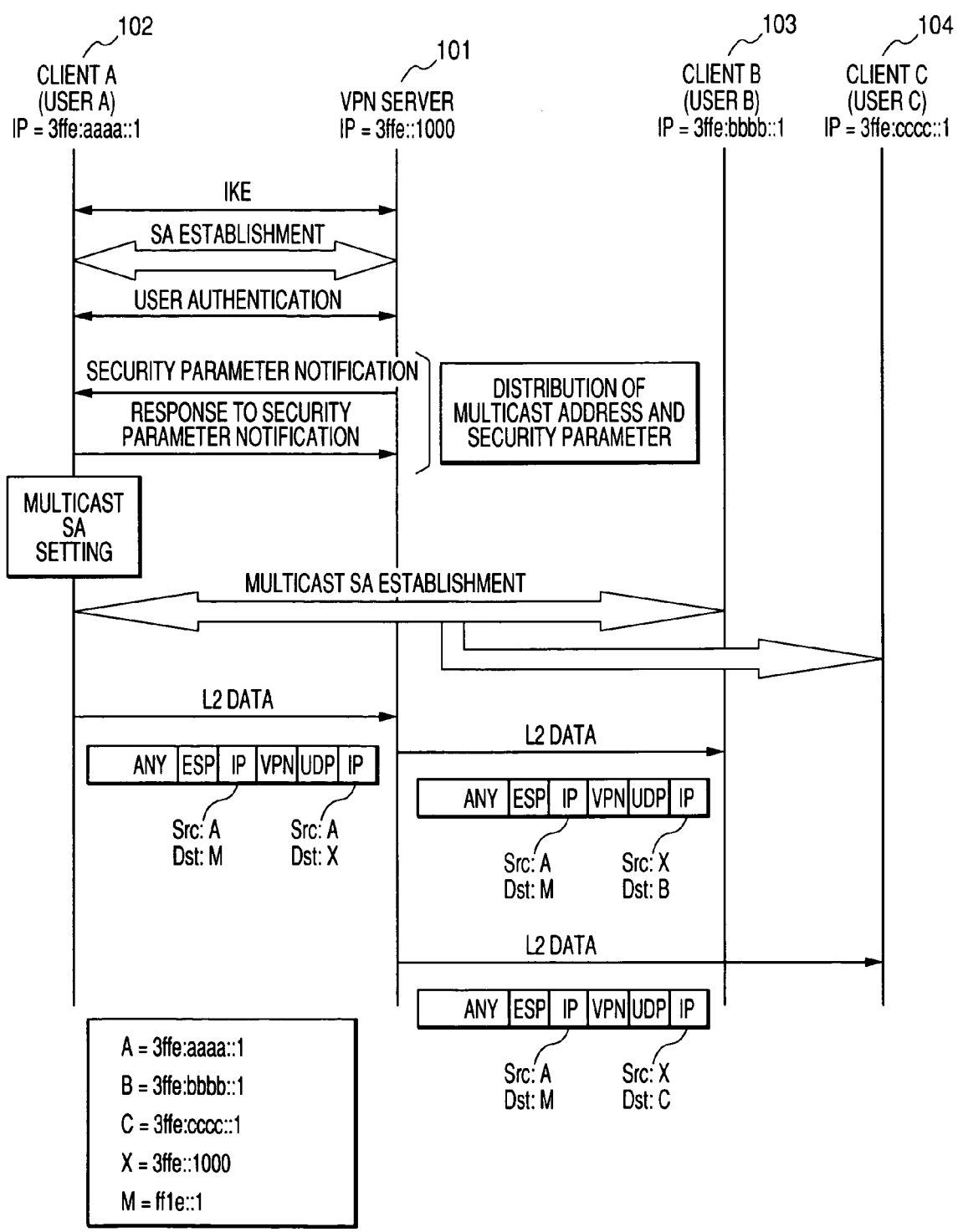

FIG. 4-1

VPN INFORMATION MANAGEMENT TABLE
309

| VPN SERVER ADDRESS | VPN MULTICAST ADDRESS |
|---|---|
| 3ffe::1000 | ff1e::1 |

FIG. 4-2

EXTERNAL LAN MAC MANAGEMENT TABLE
311

| EXTERNAL LAN MAC ADDRESS | VALID TIME |
|---|---|
| bb | 3600 |
| cc | 3000 |

FIG. 6-1

USER VPN GROUP MANAGEMENT TABLE

506

| USER ID | VPN ID |
|---|---|
| USER A | 1001 |
| USER B | 1001 |
| USER C | 1001 |
| USER D | 1002 |

FIG. 6-2

UNICAST GROUP MANAGEMENT TABLE

507

| VPN-ID | GROUP UNICAST ADDRESS |
|---|---|
| 1001 | 3ffe:aaaa::1 (USER A)<br>3ffe:bbbb::1 (USER B)<br>3ffe:cccc::1 (USER C) |
| 1002 | 2001:aaaa::1 (USER D)<br>2002:bbbb::1 (USER E)<br>3ffe:cccc::1 (USER F) |
| 1003 | 2003:aaaa::1 (USER G) |

FIG. 6-3

MULTICAST ADDRESS MANAGEMENT TABLE
~508

| VPN-ID | MULTICAST ADDRESS | SECURITY ASSOCIATION |
|---|---|---|
| 1001 | ff1e::1 | SA 1 |
| 1002 | ff1e::2 | SA 2 |
| 1003 | ff1e::3 | SA 4 |

FIG. 6-4

MAC IP CORRESPONDENCE MANAGEMENT TABLE
~509

| MAC ADDRESS | IP ADDRESS |
|---|---|
| aa | 3ffe:aaaa::1 |
| bb | 3ffe:bbbb::1 |

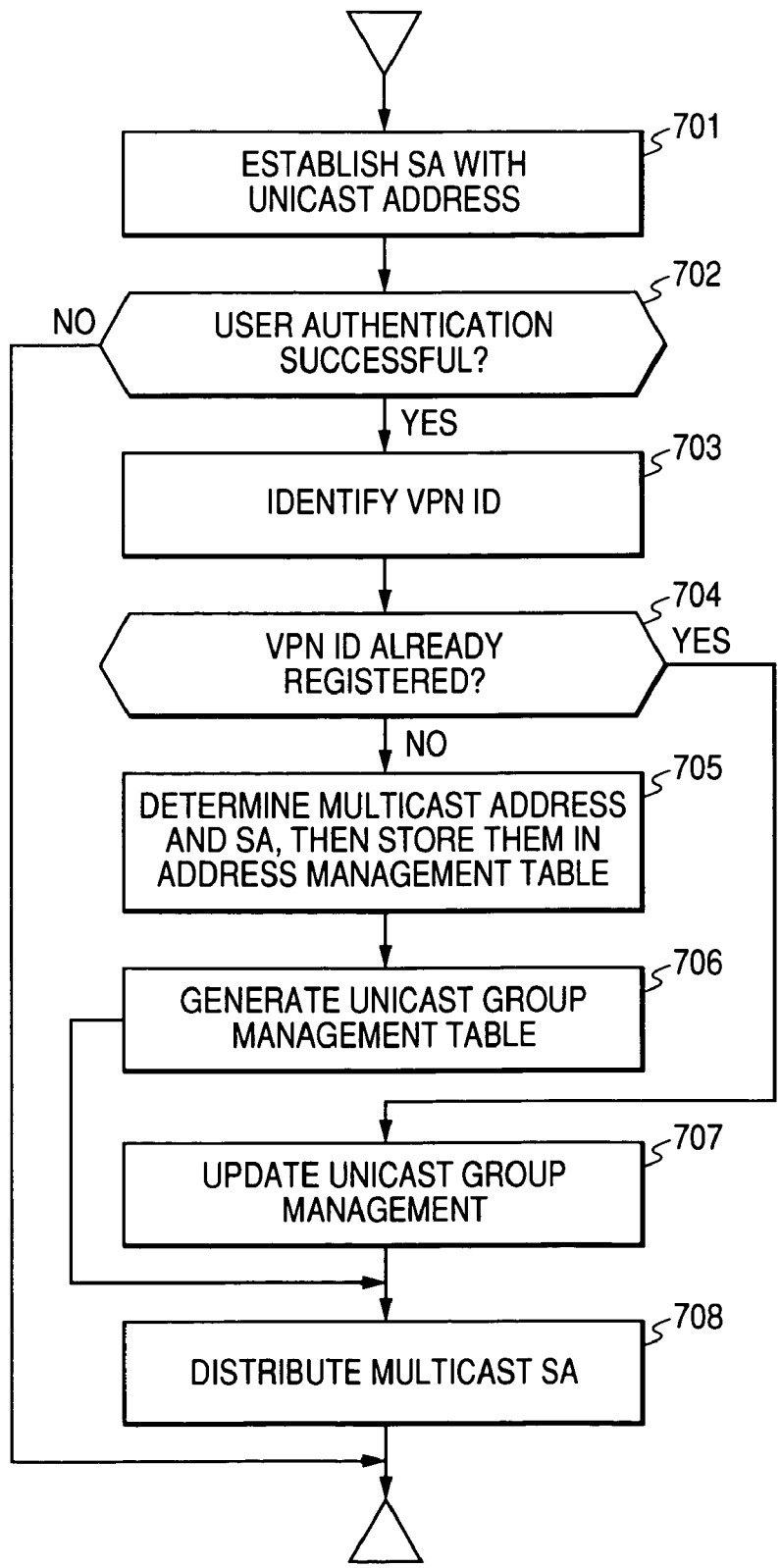

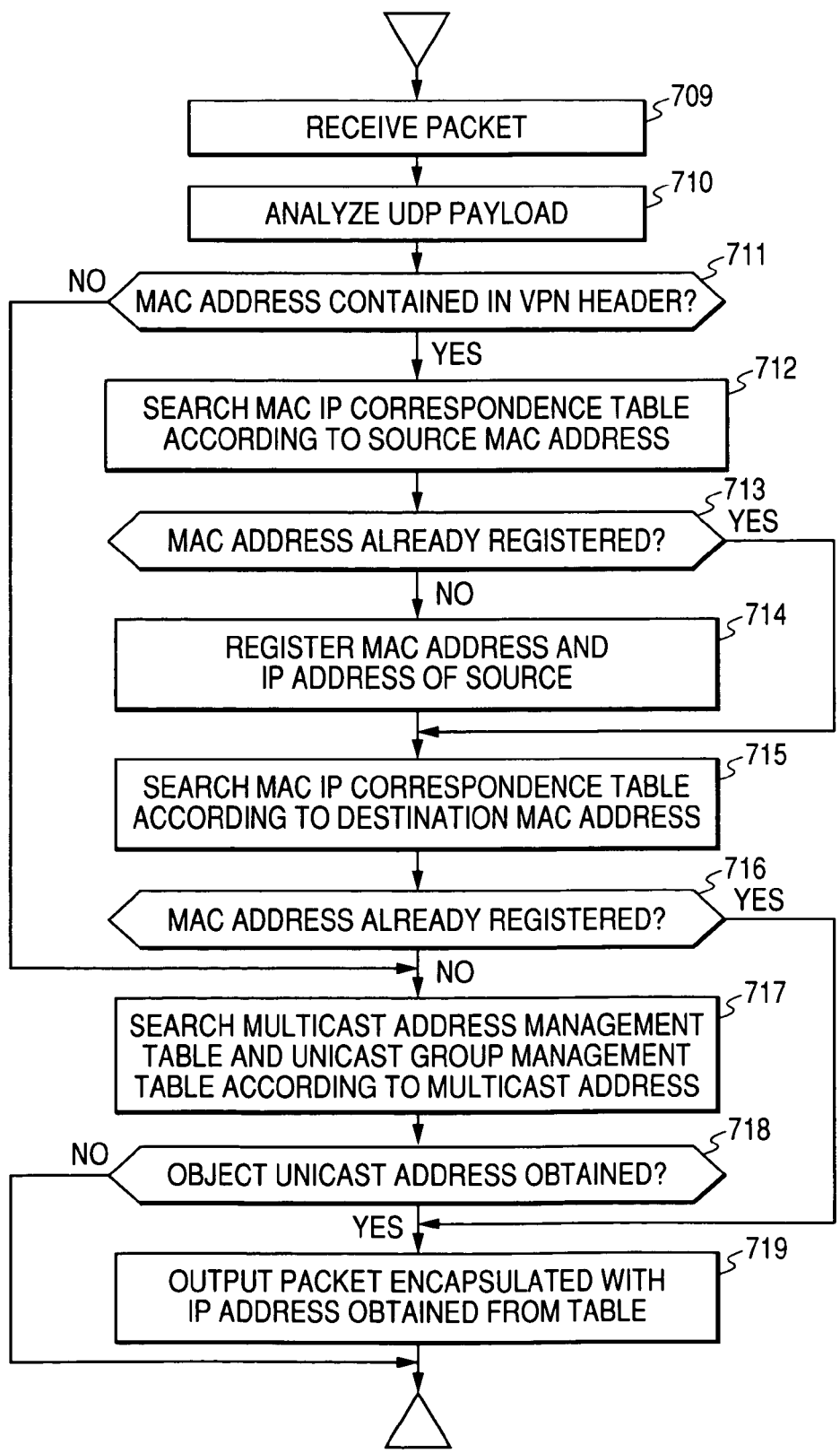

TRANSMISSION PROCESSING

RECEIVING PROCESSING

NEXT DATA = 1: NEXT DATA DENOTES SOURCE AND DESTINATION MAC ADDRESS

NEXT DATA = 2: NEXT DATA DENOTES IP HEADER

FIG. 12-1

MULTICAST ADDRESS MANAGEMENT TABLE

| VPN-ID | SUB ID | MULTICAST ADDRESS | SECURITY ASSOCIATION |
|--------|--------|-------------------|----------------------|
| 1001 | 1 | ff1e::1 | SA 1 |
| 1001 | 2 | ff1e::1 | SA 10 |
| 1002 | 1 | ff1e::2 | SA 2 |
| 1003 | 1 | ff1e::3 | SA 4 |

VPN SUB ID GROUP MANAGEMENT

| USER ID | SUB ID |
|---------|--------|
| USER A | 1 |
| USER B | 1 |
| USER C | 2 |

FIG. 19

UNICAST GROUP MANAGEMENT TABLE
TO BE DISTRIBUTED TO VPN SERVER B

~507

| VPN-ID | GROUP UNICAST ADDRESS |
| --- | --- |
| 1001 | 3ffe:cccc::1 (USER C)<br>3ffe::1000:a (VPN SERVER A) |
| 1002 | 2001:aaaa::1 (USER D)<br>2002:bbbb::1 (USER E)<br>3ffe::1000:a (VPN SERVER A) |
| 1003 | 3ffe::1000:a (VPN SERVER A) |

SERVER, VPN CLIENT, VPN SYSTEM, AND SOFTWARE

CLAIM OF PRIORITY

The present invention claims priority from Japanese application JP 2004-283021 filed on Sep. 29, 2004, the content of which is hereby incorporated by reference into this application.

FIELD OF THE INVENTION

The present invention relates to a communication system that forms a logical virtual private network between physically separated key places using the Internet protocol.

BACKGROUND OF THE INVENTION

As a method for forming an L2VPN through the Internet, a tunneling method is one of well-known ones. According to this tunneling method, an ether frame flowing in a LAN connected to a sender's VPN device is caught and encapsulated with the IP, then sent to its receiver's VPN device. Receiving the IP packet that is an encapsulated ether frame, the receiver's VPN device takes out the ether frame from the received IP packet, then sends the ether frame to a LAN connected to the receiver's VPN device. The L2VPN is formed in such way.

Communications through the Internet have always been confronted with such problems as wiretapping and illegal altering by third parties in communication channels. This is why data that must be sent/received safely has been required to be encrypted. The IPsec (IP Security Protocol) is one of the generally known methods for protecting data in IP packets from such wiretapping and illegal altering (for example, refer to the non-patent document 1). The IPsec encrypts/decrypts IP packets according to a security association in which the necessary encrypting method and key are defined beforehand. The security association is established dynamically through an IKE (Internet Key Exchange) operation or it is set manually beforehand.

The multicasting method is known well as a technique for sending IP packets having the same content from one terminal to a plurality of terminals. In case of the unicasting communication method, if there are a plurality of terminals of receivers, the sender's terminal is required to copy each IP packet to be sent as many as the number of the terminals of the receivers. In case of the multicasting communication method, the sender's terminal is required to send only one IP packet and a proper multicast router existing in the communication channel copies the IP packet. The sender's terminal can thus reduce both of the processing load and the traffic, thereby the terminal comes to use the network efficiently.

[Non-patent document 1] IETF, RFC2401

SUMMARY OF THE INVENTION

If an L2VPN is formed with the Internet while keeping both virtual private area and security properties, data to be exchanged between each VPN client and a VPN server is required to be encrypted. And, the VPN server decrypts the data received from each VPN client using the source VPN client key to determine the destination VPN client, then encrypts the received data using the destination VPN client key. Such encrypting and decrypting operations are highly loaded, so that the VPN server throughput comes to be lowered.

Each VPN client encrypts each ether frame according to the multicast address security association received from the VPN server, then encapsulates the ether frame with an IP packet to be sent to the multicast address. This encrypted multicast IP packet is further encapsulated with an IP packet to be sent to the VPN server IP address, then sent to the VPN server in the unicasting manner. The VPN server, when receiving the IP packet from the VPN client, decapsulates the IP packet once to determine the destination VPN client from the multicast address set in the multicast IP packet and encapsulates the data with an IP packet to be sent to the destination PVN client IP address, then sends the IP packet actually to the destination VPN client IP address. The VPN client then decapsulates the received IP packets at a time, then decrypts the contained multicast IP packet according to the multicast security association to obtain encapsulated ether frames.

According to the present invention, therefore, the VPN server processing load is reduced significantly and the VPN server throughput is improved.

BRIEF DESCRIPTION OF THE DRAWINGS

FIG. 1 is a sequence of how processings are performed according to the present invention;

FIG. 3-1 is a conceptual diagram of an internal configuration of a VPN client used in the present invention;

FIG. 3-2 is a conceptual diagram of internal processings of a VPN client used in the present invention;

FIG. 4-1 is a conceptual diagram of a VPN information management table;

FIG. 4-2 is a conceptual diagram of an external LAN MAC management table;

FIG. 5-1 is a conceptual diagram of an internal configuration of a VPN server used in the present invention;

FIG. 5-2 is a conceptual diagram of internal processings of the VPN server used in the present invention;

FIG. 6-1 is a conceptual diagram of a user VPN group management table;

FIG. 6-2 is a conceptual diagram of a unicast group management table;

FIG. 6-3 is a conceptual diagram of a multicast address management table;

FIG. 6-4 is a conceptual diagram of a MAC IP correspondence management table;

FIG. 7-1 is a flowchart of VPN server user/VPN management processings;

FIG. 7-2 is a flowchart of VPN transfer processings by a VPN server;

FIG. 8-1 is a flowchart of VPN transfer/transmission processings of a VPN client;

FIG. 8-2 is a flowchart of VPN transfer/receiving processings of the VPN client;

FIG. 12-1 is a conceptual diagram of a multicast address management table;

FIG. 12-2 is a conceptual diagram of a VPN sub-ID management table;

FIG. 19 is a conceptual diagram of a unicast group management table used when processings are performed according to the present invention through a plurality of VPN servers.

DETAILED DESCRIPTION OF THE PREFERRED EMBODIMENTS

First Embodiment

Figure 2:
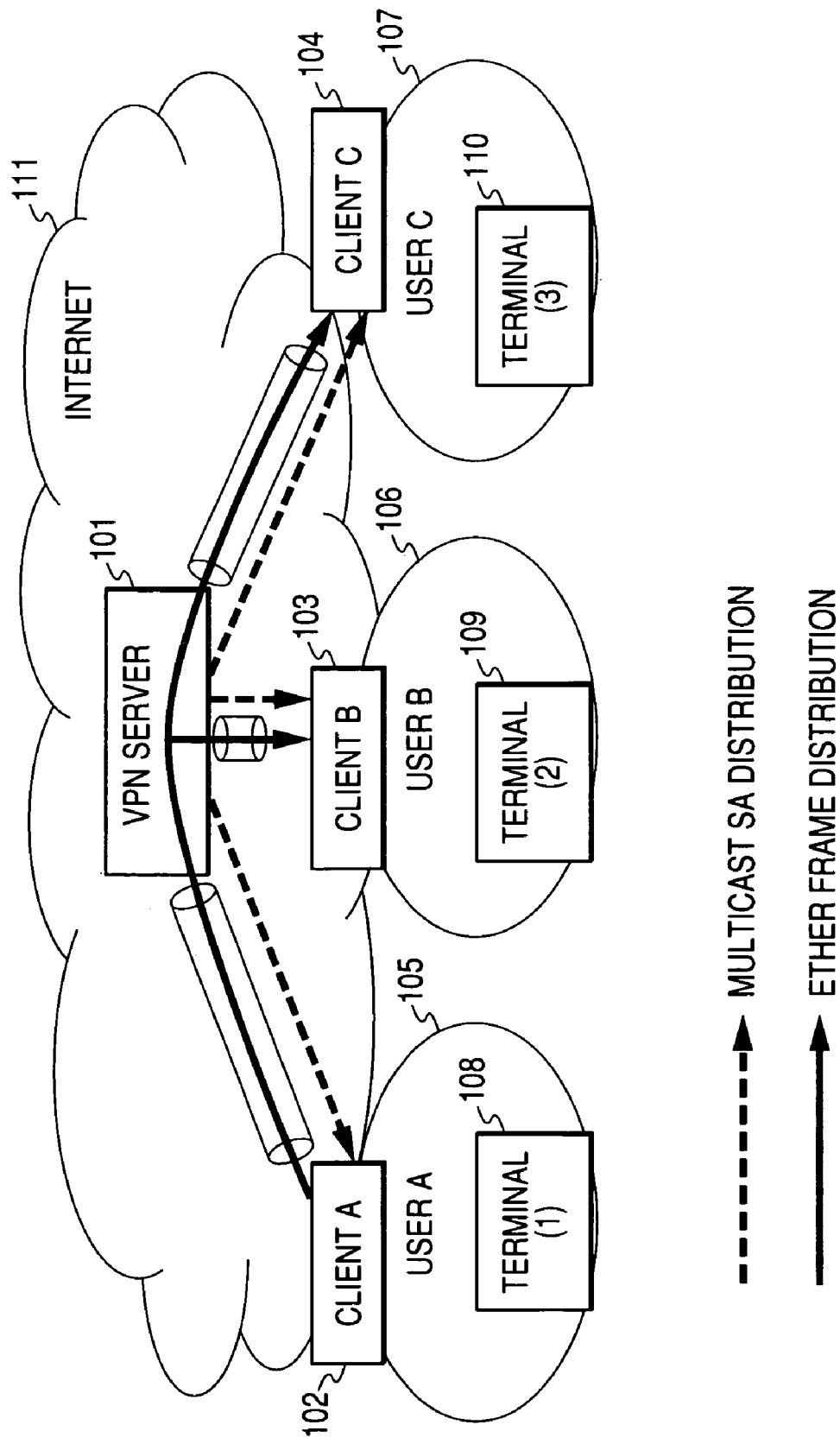
FIG. 2 is a conceptual diagram of a network through which processings are performed according to the present invention.

FIG. 2 shows a communication system of the present invention. The communication system comprises a VPN server 101, VPN clients A102, B103, and C104, LANs 105 to 107 to each of which the corresponding one of the VPN clients A102, B103, and C103 is connected, a terminal (1)108 belonging to the LAN 105, a terminal (2) 109 belonging to the LAN 106, and a terminal (3)110 belonging to the LAN 107. The VPN server 101 is connected to each of the VPN clients 102 to 104 through the Internet 111.

Figures 1, 3:
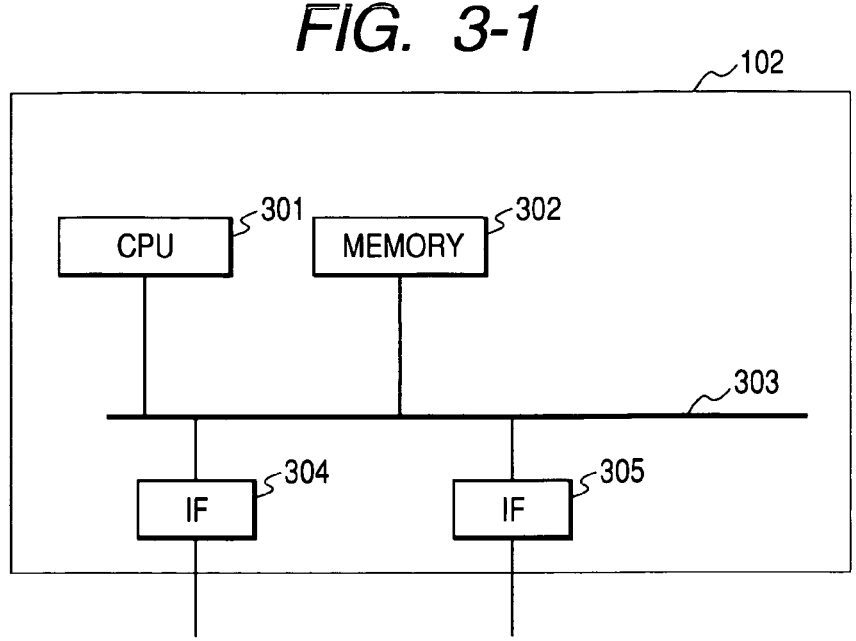
Figures 2, 3:
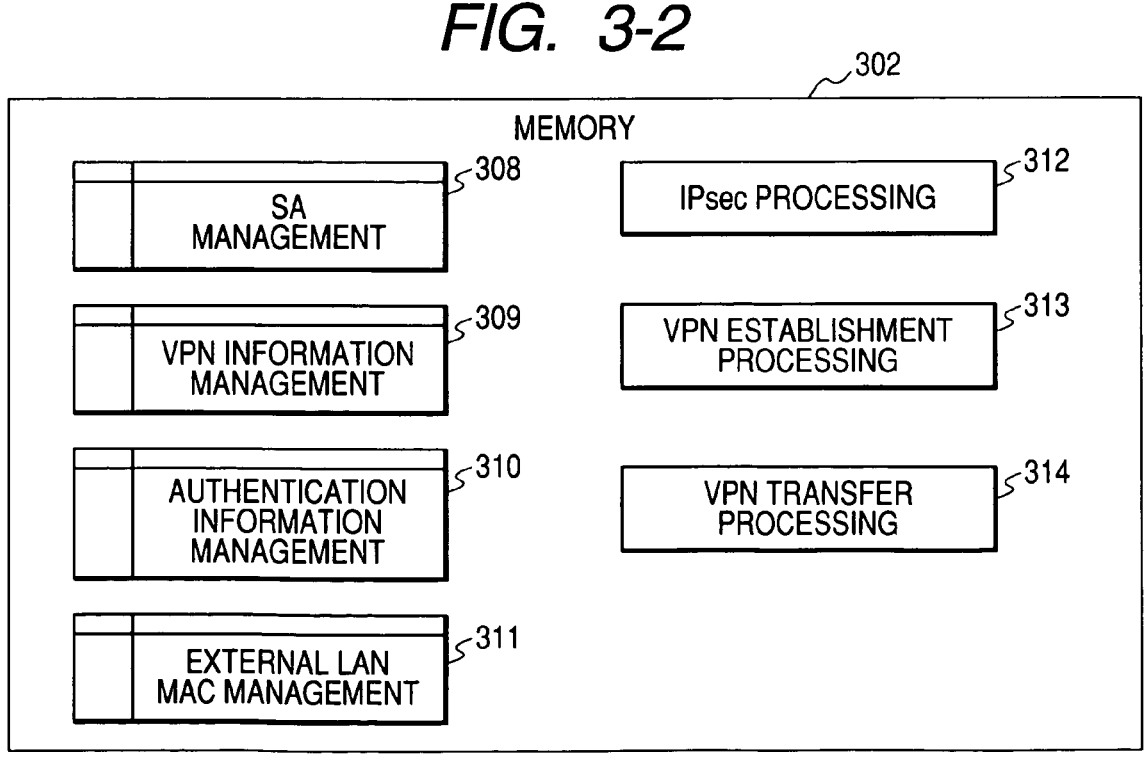

FIG. 3-1 shows a block diagram of the VPN client A102. The VPN client A102 comprises a CPU (Central Processing Unit) 301, a memory 302, and interface parts 304 and 305. The CPU 301 executes various kinds of application programs and an OS (Operating System) actually. The memory 302 stores programs, as well as various kinds of application programs used for the processings executed by the CPU 301. The CPU 301 and the memory 302 are connected to each other through a bus 303. Each of the interface parts 304 and 305 supplies data received from the memory 302 to external devices. One of the interface parts 304 and 305 is connected to the LAN 105 and the other is connected to the Internet 111. FIG. 3-2 shows information items stored in the memory 302. The memory 302 also stores programs related to the IPsec processing 312, the VPN establishing processing 313, the VPN transfer processing 314, etc., as well as such information management tables as the security association (SA) management table 308, the VPN information management table 309, the authentication information management table 310, the external LAN MAC management table 311, etc.

The security association management table 308 manages the IPsec security association. The VPN information management table 309 manages the VPN server unicast address usable by the VPN clients and the VPN transfer multicast address.

FIG. 4-1 shows a configuration of the VPN information management table 309. The table shows that the VPN server IP address is "3ffe: 1000" and the VPN transfer multicast address is "ffe: 1" in this example.

The authentication information management table 310 manages both user ID and password of a VPN client required for user authentication when establishing a VPN.

The external LAN MAC address management table 311 manages the MAC addresses of the terminals (2)109 and (3)110 belonging to the LANs 106 and 107 connected to the VPN clients B103 and C104 connected to the VPN client A102 through the VPN server 101, as well as the lifetimes of the MAC addresses. Each lifetime is updated each time a communication with a terminal is started. If the lifetime is not updated for a certain time and becomes 0, the registered MAC address is deleted from the external LAN MAC address management table 311.

FIG. 4-2 shows a configuration of the external LAN MAC address management table 311. In this example, the table 311 shows that the MAC addresses of the terminals (2)109 and (3)110 are "bb" and "cc" and the lifetimes of those MAC addresses are 3600 sec and 3000 sec respectively.

Figures 1, 5:
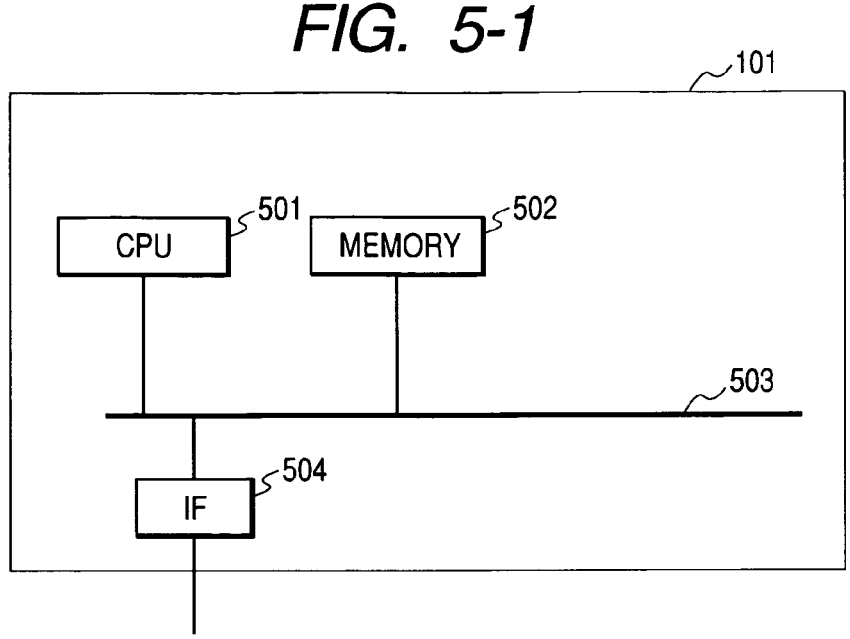
Figures 2, 5:
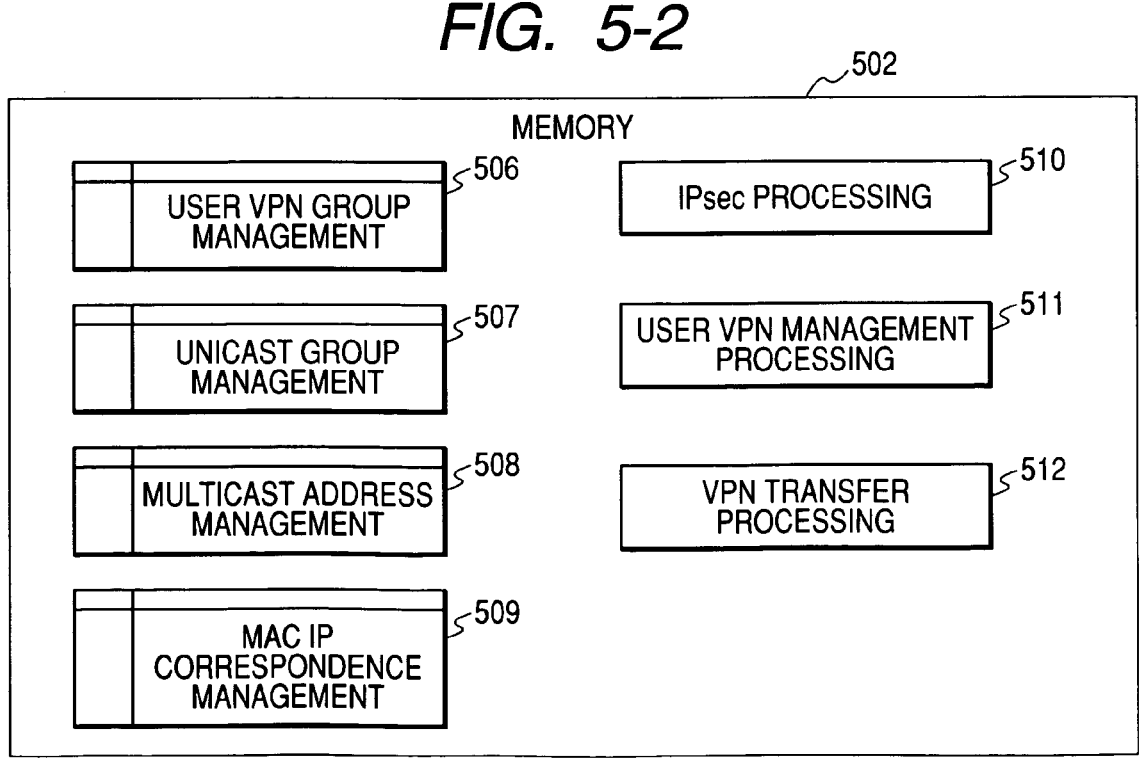

FIG. 5-1 shows a block diagram of the VPN server 101. The VPN server 101 comprises a CPU 501, a memory 502, and an interface part 504. The CPU 501, the memory 502, and the interface part 504 are connected to each another through a bus 503. The interface part 504 is connected to the Internet 111.

FIG. 5-2 shows information items stored in the memory 502. The memory also stores programs related to the IPsec processings 510, the VPN management processings 511, the VPN transfer processings 512, etc., as well as such information management tables as the user VPN management table 506, the unicast group management table 507, the multicast address management table 508, the MAC-IP correspondence management table 509, etc.

FIG. 6-1 shows a configuration of the user VPN group management table 506. The user VPN group management table 506 manages the VPN group to which each user belongs. In this example, the users A, B, and C belong to the VPN group 1001 while the user D belongs to the VPN group 1002.

FIG. 6-2 shows a configuration of the unicast group management table 507. The unicast group management table 507 manages the unicast IP address used by the users who belong to the same VPN group. In this example, the unicast group management table 507 shows that "3ffe:aaaa::1", "3ffe:bbbb::1", and "3ffe:cccc::1" are the IP addresses used by the users A, B, and C belonging to the same VPN group 1001.

FIG. 6-3 shows a configuration of the multicast address management table 508. The multicast address management table 508 manages the multicast address used currently by each VPN group and the security association corresponding to the multicast address. In this example, the VPN group 1001 uses the multicast address "ffe::1" and the security association SA1 corresponds to the multicast address "ffe::1". The security association means IPsec security association that includes an encrypting algorithm, a key, an SPI (Security Parameter Index), etc.

FIG. 6-4 shows a configuration of the MAC-IP correspondence management table 509. The MAC-IP correspondence management table 509 manages the correspondence between each terminal MAC address and the IP address of the VPN client to which the terminal belongs. In this example, the MAC address "aa" of the terminal (1)108 corresponds to the IP address "3ffe:aaa::1" of the VPN client A102 and the MAC address "bb" of the terminal (2) 109 corresponds to the IP address "3ffe:bbbb::1" of the VPN client B103.

FIG. 1 shows a sequence of processings performed when the LANs 105 to 107 are connected to each another through the L2VPN in accordance with the LAN-LAN connecting method of the present invention. The clients A102, B103, and C104 are all VPN clients and the users A, B, and C of those VPN clients are assumed to agree that the LANs 105 to 107 are connected to each another through the L2VPN.

When establishing a multicast security association among the VPN clients in the same VPN group, the subject VPN client executes the VPN establishment processing 313 while the VPN server executes the VPN management processing 511 as follows.

At first, a unicast security association is established between the VPN client A102 and the VPN server 101. The VPN client A102 then encrypts data using the IPsec and requests user authentication to the VPN server 101 according to the information registered in the authentication information management table 310. The VPN server 101 then authenticates user. If the user authentication is ended successfully, the VPN server 101 notifies the VPN client A102 of the multicast address used for the VPN connection, as well as the security association corresponding to the multicast address as a security parameter. The VPN client registers the received security parameter in the security association management table 308 and establishes the security association with the target VPN group. Similarly, the clients B and C establish the security association with the target VPN group.

FIG. 7-1 shows a flowchart of the user VPN management processing 511 by the VPN server 101. The processing 511 is executed until the subject VPN client establishes a multicast security association in the sequence shown in FIG. 1.

In response to the request from the VPN client A102, the VPN server 101 establishes a security association with the VPN client A102 using a unicast address through an IKE operation, etc. (step 701). When the security association with the VPN client A102 is established, the VPN server 101 encrypts the object data using the IPsec, then authenticates user. The user authentication may also be done while establishing the security association using XAUTH or the like. The VPN server 101 then determines whether or not the user authentication is ended successfully (step 702). If the determination result is NO (not ended successfully), the VPN server 101 exits the processing. If the determination result is YES (ended successfully), the VPN server 101 refers to the user VPN group management table 506 according to the user ID used for the user authentication to identify the user VPN ID (step 703). Then, according to the VPN ID, the VPN server 101 refers to the unicast group management table 507 to determine whether or not the VPN ID is already registered there (step 704).

If the VPN ID is not registered in the unicast group management table 507, the VPN server 101 determines the current VPN connection to be from the first VPN client in the user group that shares the same VPN ID and determines the multicast address to be used for the subsequent VPN connection. After that, the VPN server 101 generates a security association corresponding to the determined multicast address and stores the security association in the multicast address management table 508 together with the multicast address (step 705). The VPN server 101 then generates the multicast address management table 508 for the VPN ID identified in step 703 and registers the VPN client unicast address in the table 508 (step 706). If the VPN ID is already registered in the user VPN group management table 506, the VPN server 101 does not generate nor register both of the multicast address and the security association. Instead, the VPN server 101 adds the VPN client unicast address to the unicast group management table 507 (step 707). After that, the VPN server 101 notifies the VPN client A102 of the multicast address used by the VPN group and the security association corresponding to the multicast address, then exits the processing (step 708).

The multicast security association is thus established among the VPN clients in the same VPN group.

Next, how to transfer an ether frame will be described with reference to FIG. 1 again. The VPN client A102 encapsulates the object ether frame with an IP packet and sends the IP packet to the VPN server 101. The VPN client A102 executes the VPN transfer processing 314 to send the encapsulated IP packet. The VPN server 101 then executes the VPN transfer processing 511 to transfer the IP packet addressed to itself from the VPN client A102 to a proper VPN client.

Figures 1, 8:
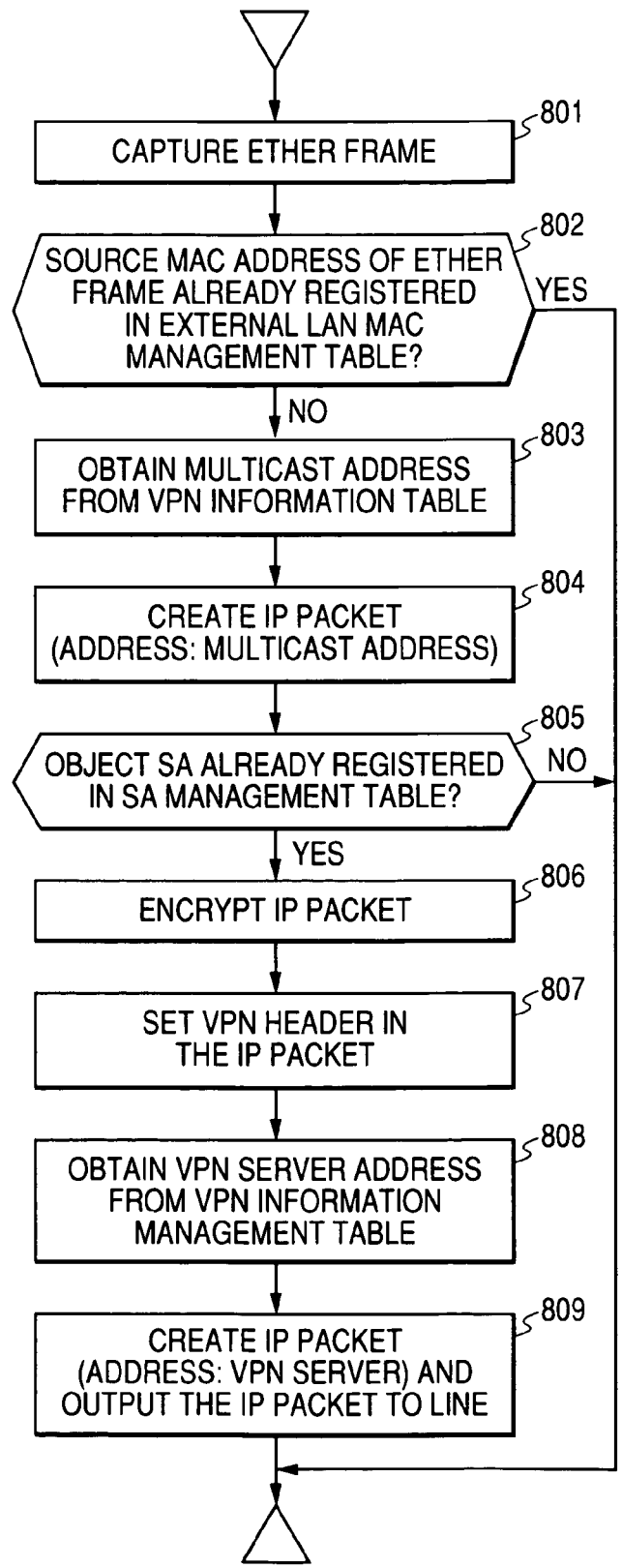
Figures 2, 8:
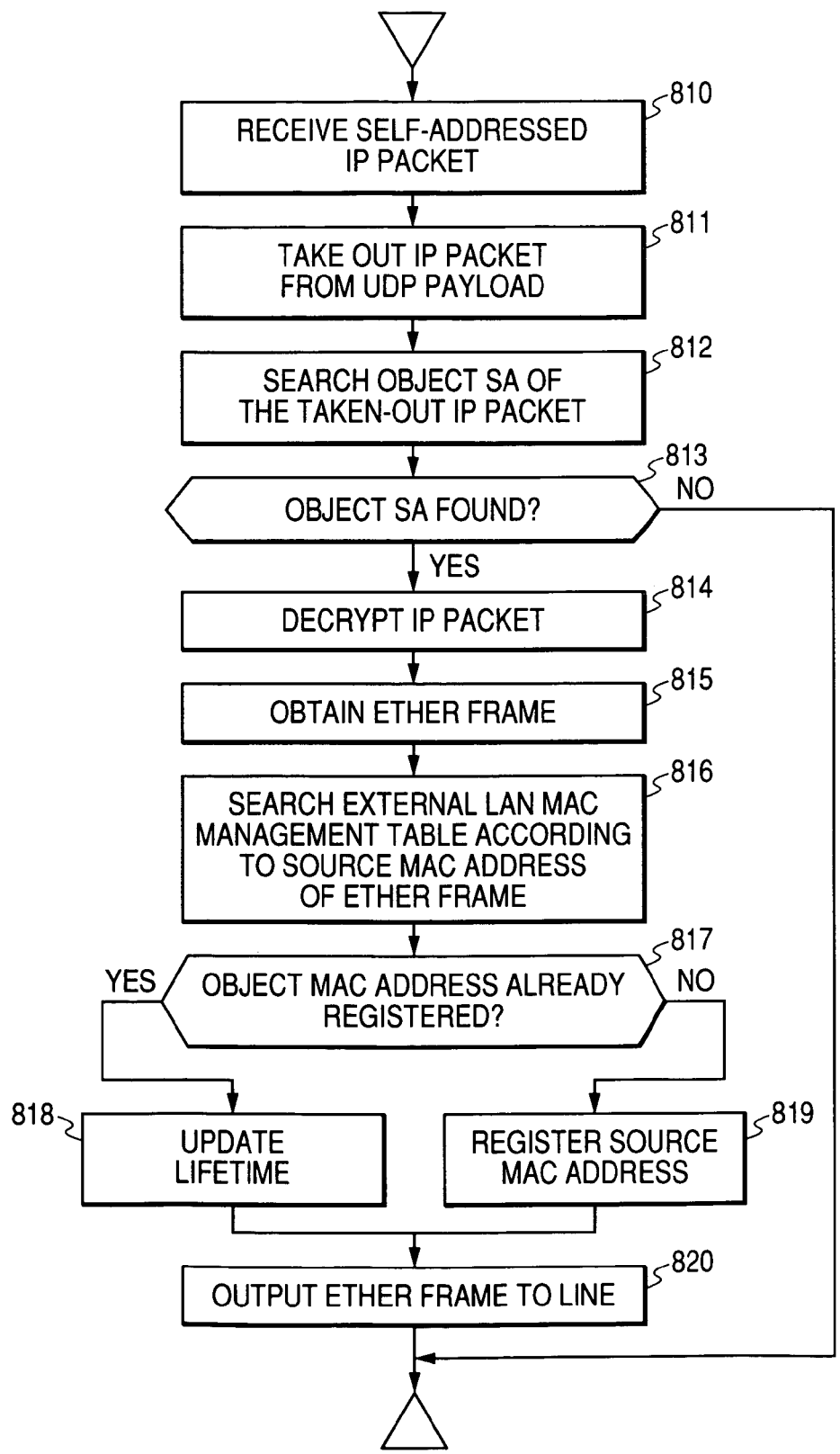

FIG. 8-1 shows a flowchart of the VPN transfer processing by a VPN client. The VPN client A102 captures all the ether frames flowing in the connected LAN 105 (step 801). The VPN client A102 checks whether or not the source MAC address of each ether frame is registered in the external LAN MAC address management table 311 (step 802). If the MAC address is already registered in the table 311, the VPN client A102 discards the caught ether frame and exits the processing. If the MAC address is not registered in the table 311, the VPN client A102 obtains the multicast address used by the subject VPN group from the VPN information management table 309 (step 803). After that, the VPN client A102 creates an IP packet to payload each captured ether frame in step 801. The destination address of the created IP packet is the multicast address obtained in step 803 (step 804). After that, the IP packet created in step 804 will be referred to as an internal packet and the header of the internal packet will be referred to as an internal IP header.

By using the destination address of the internal IP header as a multicast address, the VPN server can identify the target destination VPN client according to the multicast address.

The VPN client A then determines whether or not the security association corresponding to the multicast address used as the destination address is registered in the security association management table 308 (step 805). If the system is normal, the security association corresponding to the multicast address received in step 708 is already registered in the table 308. If the security association is not registered in the table 308, the VPN client A102 exits the processing. If the security association is registered in the table 308, the VPN server encrypts the internal IP packet created in step 804 (step 806) according to the registered information. By encrypting each internal IP packet according to the security association corresponding to the multicast address in such way, the destination VPN client can decrypt the internal IP packet; the VPN server is not required to decrypt and encrypt again the internal IP packet. The VPN client A 102 then adds a VPN header 901 to the internal IP packet encrypted in step 806 (step 807).

Figure 9:
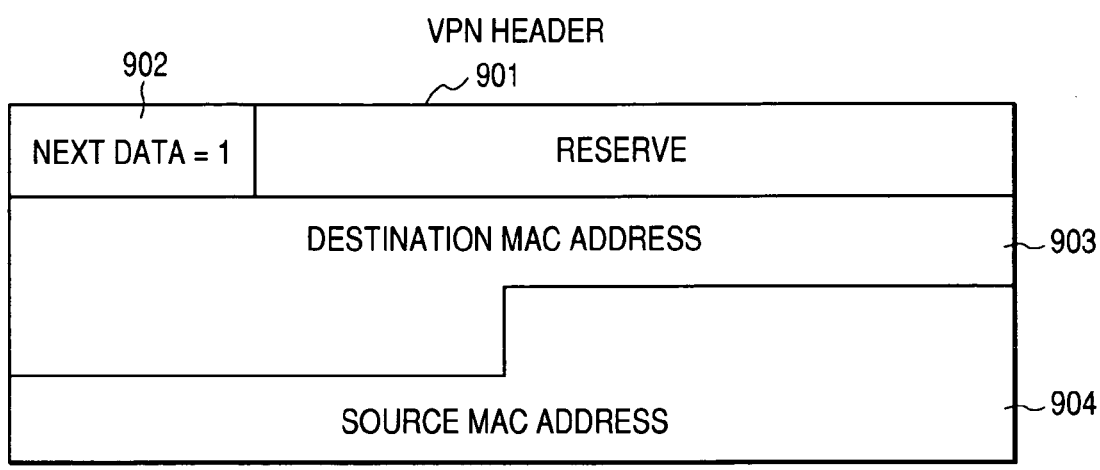
FIG. 9 is a conceptual diagram of a VPN header.

FIG. 9 shows a configuration of a VPN header. The VPN header 901 includes a data field 902 for denoting whether the next field is a MAC address field or IP header field, as well as a source MAC address 903 and a destination MAC address 904 if the next field 902 is a MAC address field. The VPN client obtains the IP address of the VPN server from the VPN information management table 309 (step 808). The VPN client creates an IP packet in which the data created in step 807 is set in a UDP payload, then sets the destination IP address in the address of the VPN server obtained in step 808 and outputs the IP packet to a communication line connected to the Internet (step 809). Hereinafter, an IP packet created in step 809 will be referred to as an external IP packet and the header of the external IP packet will be referred to as an external IP header.

Figure 10:
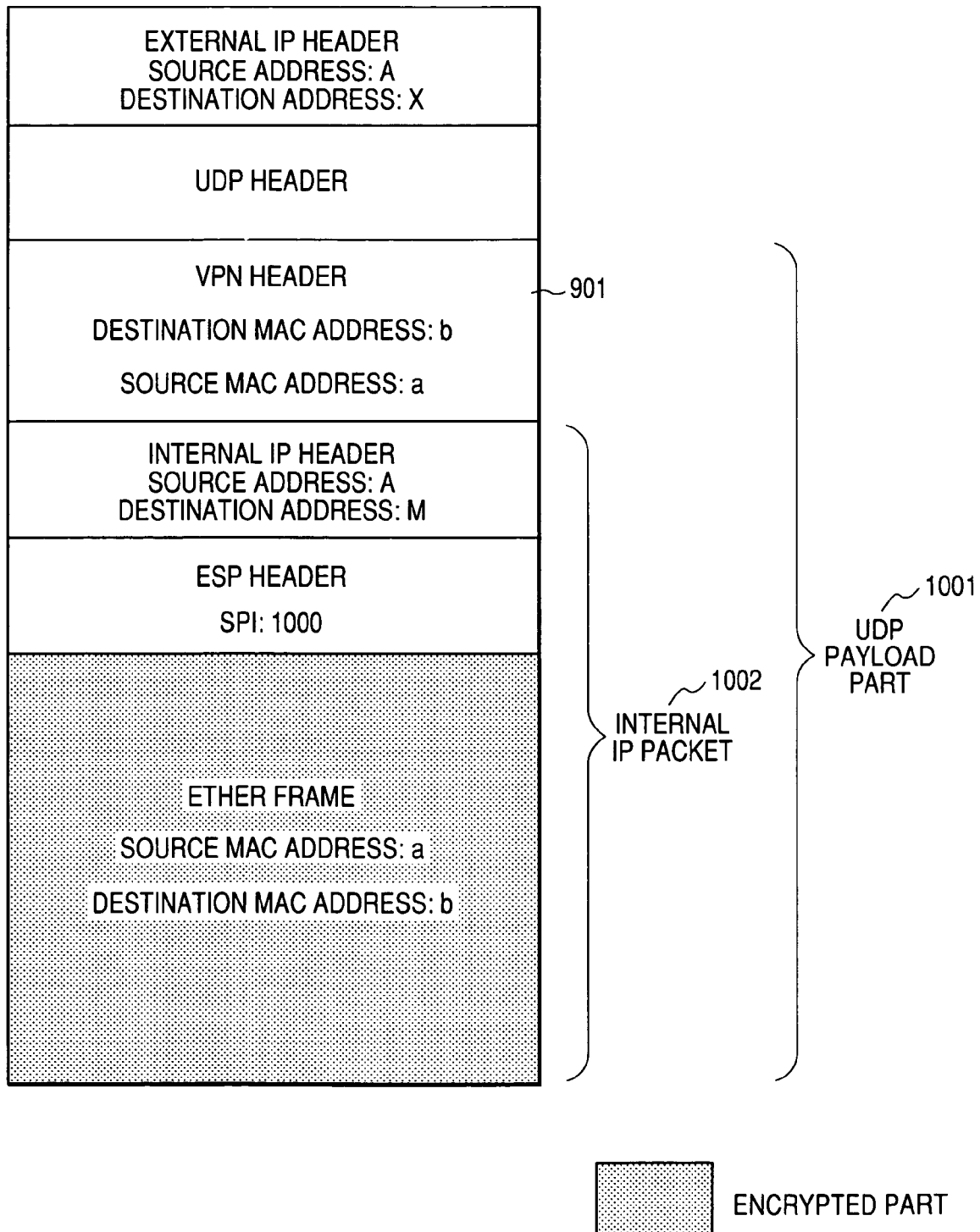
FIG. 10 is a conceptual diagram of a structure of data flowing in a communication line.

FIG. 10 shows a configuration of an IP packet created in a transmission processing by the VPN client A102. An internal IP packet is set in the UDP payload part 1001 of an external IP packet to be addressed to a VPN server, then a caught ether frame is set in the internal IP packet to be sent to the multicast address. The internal IP packet is sent to the multicast address to which the VPN header 901 is given. Because a multicast address is assumed as the destination address of the internal IP header in such way, the VPN server can identify the destination VPN client without decrypting the object part of the internal IP packet.

FIG. 7-2 shows a flowchart of the processings by the VPN server 101 that receives IP packets from the VPN client A102. At first, the VPN server 101 receives an IP packet addressed to itself (step 709). The VPN server 101 then analyzes the UDP payload 1001 of the external IP packet (step 710) to obtain the VPN header 901. After that, the VPN server 101 checks the next data field 902 of the VPN header to determine whether or not the VPN header 901 contains a MAC address (step 711). If the determination result is YES (contains), the VPN server 101 refers to the MAC-IP correspondence management table 509 according to the source MAC address 904 obtained from the VPN header 901 to determine whether or not the MAC address is registered in the table 509 (step 713). If the determination result is NO (not registered), the VPN server 101 registers the correspondence between the source MAC address notified with the VPN header 901 and the source IP address of the IP packet received in step 709 in the MAC-IP correspondence management table 509 (step 714). The VPN server 101 refers to the MAC-IP correspondence management table 509 according to the destination MAC address obtained from the VPN header 901 (step 715) to determine whether or not the destination MAC address is registered (step 716).

If the MAC address obtained from the destination MAC address of the VPN header 901 is already registered in the MAC-IP correspondence management table 509, the VPN server 101 creates an external IP packet in which the data items following the VPN header of the IP packet received in step 709 are set in the payload. The IP address obtained from the MAC-IP correspondence management table 509 is assumed as the destination IP address of the created external IP packet. The VPN server 101 then outputs the created external IP packet to a communication line (step 719). If the MAC address obtained from the destination MAC address of the VPN header 901 is not registered in the MAC-IP correspondence management table 509, the VPN server 101 obtains the VPN ID from the multicast address management table 508 referred to according to the destination address of the internal IP packet set in the UDP payload 1001 of the external IP packet received in step 709. After that, the VPN server 101 goes to the unicast group management table according to the obtained VPN ID to obtain the IP address of the client belonging to the same VPN group as that of the source VPN client of the IP packet (step 718). If the IP address cannot be obtained, the VPN server 101 exits the processing. If the IP address is obtained successfully, the VPN server 101 selects all the IP addresses obtained in step 7171 except for the source one of the external IP packet obtained in step 709. The VPN server 101 then creates an IP packet in which the data items following the VPN header of the IP packet received in step 709 are set in the payload. The VPN server 101 uses the selected IP addresses as the destination IP address of the created external IP packet, then outputs the external IP packet to a communication line (step 719).

If the MAC address is not set in the VPN header in step 711, that is, if "2" is set in the next field of the VPN header, the VPN server 101 does not search the MAC address. Instead, the VPN server 101 obtains the VPN ID from the multicast address management table 508 according to the destination address of the internal IP packet set in the UDP payload of the external IP packet received in step 709. The VPN server 101 then obtains the IP address of the client belonging to the same VPN group as that of the source VPN client of the external IP packet from the unicast group management table 507 searched according to the obtained VPN ID (step 718). If the IP address cannot be obtained, the VPN server 101 exits the processing. If the IP address is obtained successfully, the VPN server 101 selects all the IP addresses obtained in step 717 except for the source IP address of the external IP packet obtained in step 709. The VPN server 101 then creates an external IP packet in which the data items following the VPN header of the IP packet received in step 709 are set in the UDP payload. The VPN server 101 then outputs the external IP packet to a communication line using the selected IP addresses as the destination IP addresses (step 719).

FIG. 8-2 shows a flowchart of the processings of a VPN client B103 for receiving packets from the VPN server 101. The subject VPN client executes the VPN transfer processing 314 to receive those packets.

At first, the VPN client B102 receives an IP packet addressed to itself as follows (step 810). The VPN client B102 then checks the UDP payload 1001 of the received IP packet to obtain the internal packet 1002 set therein (step 811). After that, the VPN client B102 searches the security association corresponding to the obtained internal IP packet (step 812) to determine whether or not the security association is registered (step 813). If the determination result is NO (not registered), the VPN client B102 exits the processing. If the system is normal, the security association of the multicast address received from the VPN server 101 at the time of VPN connection is already registered. If the determination result is YES (registered), the VPN client B102 decrypts the internal IP packet 1002 obtained in step 811 (step 814). The VPN client B102 then obtains the object ether frame from the decrypted internal IP packet (step 815). The VPN client B102 then goes to the external LAN MAC address management table 311 according to the source MAC address of the ether frame obtained in step 815 (step 816).

If the searched source MAC address is registered in the external LAN MAC address management table 311, the VPN client B102 updates the lifetime of the MAC address (step 818) and outputs the ether frame obtained in step 815 to a communication line (step 820), then exits the processing. If the determination result is NO (not registered), the VPN client B102 registers the source MAC address in the external LAN MAC address management table 311 (step 819), then outputs the ether frame obtained in step 815 to a communication line (step 820) and exits the processing.

As described above, because the configuration shown in the first embodiment does not require the VPN server to encrypt/decrypt any internal IP packet, the VPN server's processing load is reduced and the through-put is improved.

Second Embodiment

Figure 11:
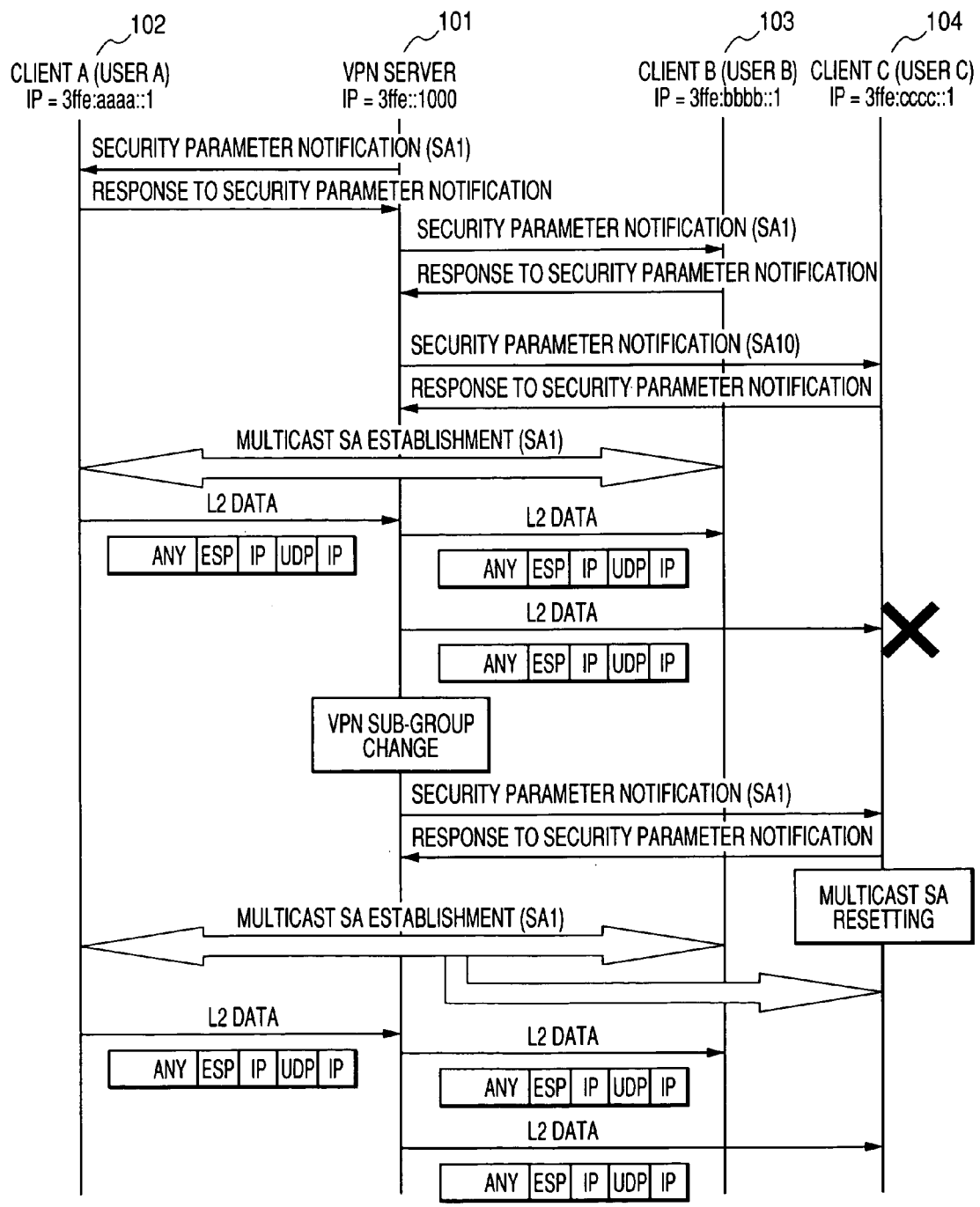
FIG. 11 is a sequence of how a client that forms the L2VPN is to be changed to another freely.

In this second embodiment, a description will be made for an example of how to change an L2VPN user to another freely in a VPN group using a sub ID as the VPN ID. FIG. 11 shows how a L2VPN user is changed to another by changing the security parameter received from the VPN server 101.

Each of the VPN clients (102 to 104) establishes a unicast address security association with each VPN client to authorize the object user just like in the first embodiment. If the user is authorized, the VPN server notifies the VPN client of the multicast address used for the VPN connection, as well as the security association corresponding to the multicast address as a security parameter. In this second embodiment, the VPN server 101 distributes a security association to each of the VPN clients (102 to 104) by changing the association in accordance with each VPN sub ID. This is why a VPN sub ID field 1201 is added to the multicast address management table 508 in this second embodiment. FIG. 12-1 shows a conceptual diagram of an expanded multicast address management table 508. The VPN sub ID is set by the manager of each VPN group beforehand. It is also possible for each user to change his/her belonging sub ID during VPN connection. FIG. 12-2 shows a conceptual diagram of a VPN sub ID group management table.

In FIG. 11, the sub IDs of the users A and B are initially set at 1 and that of the user C is set at 2 by the VPN group manager. After ending the user authentication, the VPN server 101 distributes the multicast address security association 1 to both of the clients A102 and B103 and 10 to the VPN client C103 as security parameters. Because the VPN clients A102 and B103 receive the same security association, the multicast security association between those VPN clients A102 and B103 is established. The VPN client C104 receives a different security association, so that the security association is not established between the VPN client C104 and each of the VPN clients A102 and B103.

In that state, the VPN client A102 encapsulates each captured ether frame with an IP packet and sends the encapsulated IP packet to the VPN server 101 just like in the first embodiment. The VPN server 101 then selects the VPN clients B103 and C103 according to the destination multicast address of the internal IP packet taken out from the UDP payload part, then sends the IP packet to the VPN clients B103 and C104 just like in the first embodiment. The VPN clients B103 and C104, when receiving the IP packet from the VPN server 101, attempts to decrypt the encrypted multicast IP packet. The VPN client B103, which shares the security association with the VPN client A102, can decrypt the IP packet, but the VPN client C104 that does not share the security association with the VPN client A102 cannot. Therefore, while the VPN clients A102 and B103 can form the L2VPN respectively, the VPN client C104 cannot cooperate with any of the VPN clients A102 and B103 to form the L2VPN. In other words, the VPN client C104 cannot decrypt any ether frame received from the VPN client A102 or B103 through the L2VPN.

The subject VPN group manager changes the sub ID of the user C. The VPN server 101 detects the sub ID change, then obtains the VPN ID of the user whose sub ID is changed from the user VPN group management table 506. The VPN server 101 then obtains the security association from both of the VPN ID and the sub ID with reference to the multicast address management table 508. The VPN server 101 notifies the VPN client C104 of the obtained security association used as a security parameter. The VPN client C104 obtains the multicast security association from among the received security parameters, then registers the security association in the security association management table 308. The multicast security association is thus established among the VPN clients A102, B103, and C104. Hereinafter, the VPN client C104 comes to be able to decrypt data received from the VPN client A102 or B103.

As described above, the configuration shown in the second embodiment can change clients flexibly in one VPN group.

Third Embodiment

Figure 13:
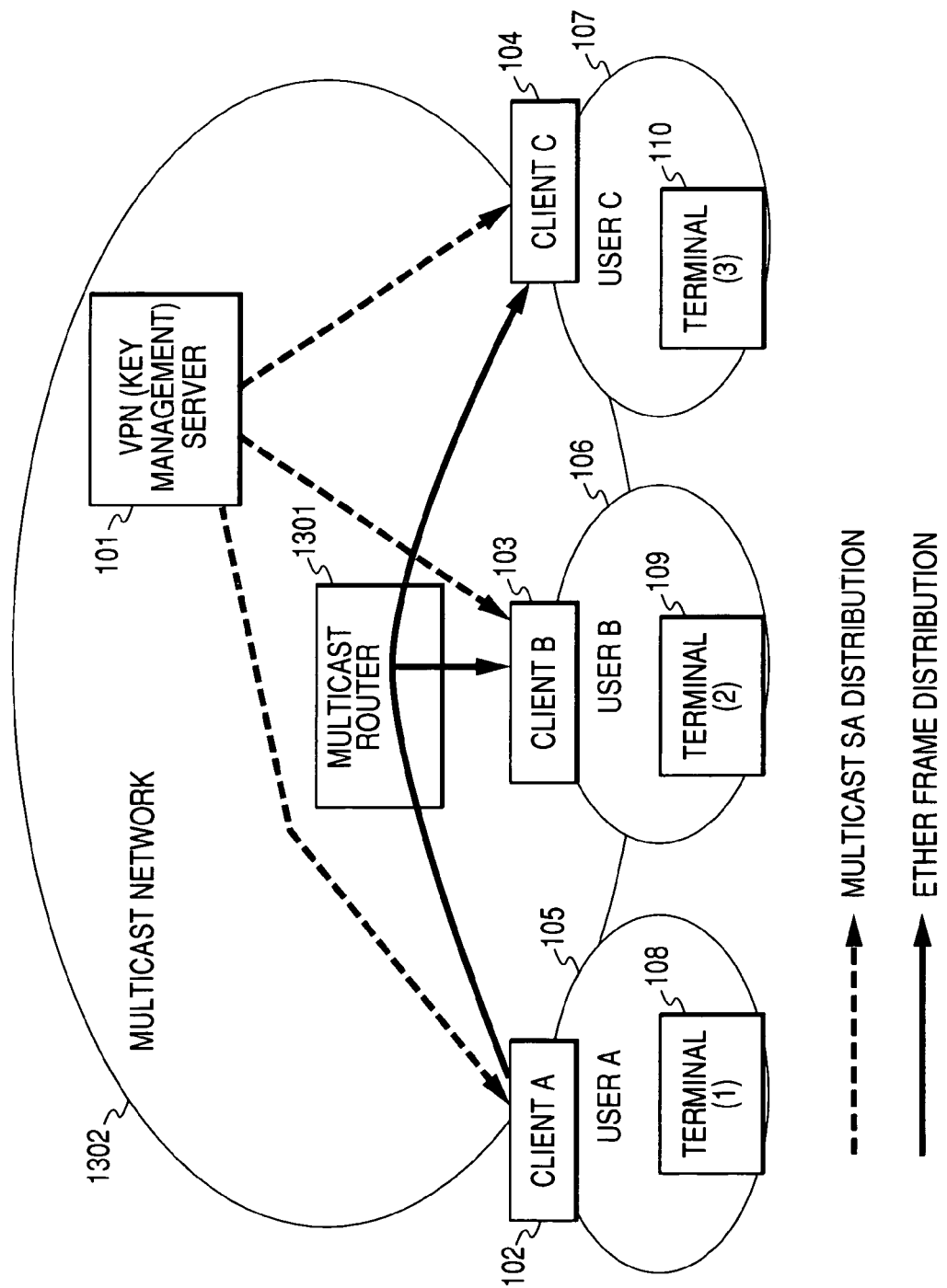
FIG. 13 is a conceptual diagram of how processings are performed according to the present invention in a multicast network.

FIG. 13 shows how processings are performed according to the present invention through a multicast network. In this third embodiment, the VPN clients (102 to 104) are connected to each another through a multicast network 1302. The multicast network 1302 has a multicast router 1301.

The VPN server 101, if it is installed at a place where IP communications are enabled, may not be installed in the multicast network 1302.

Figure 14:
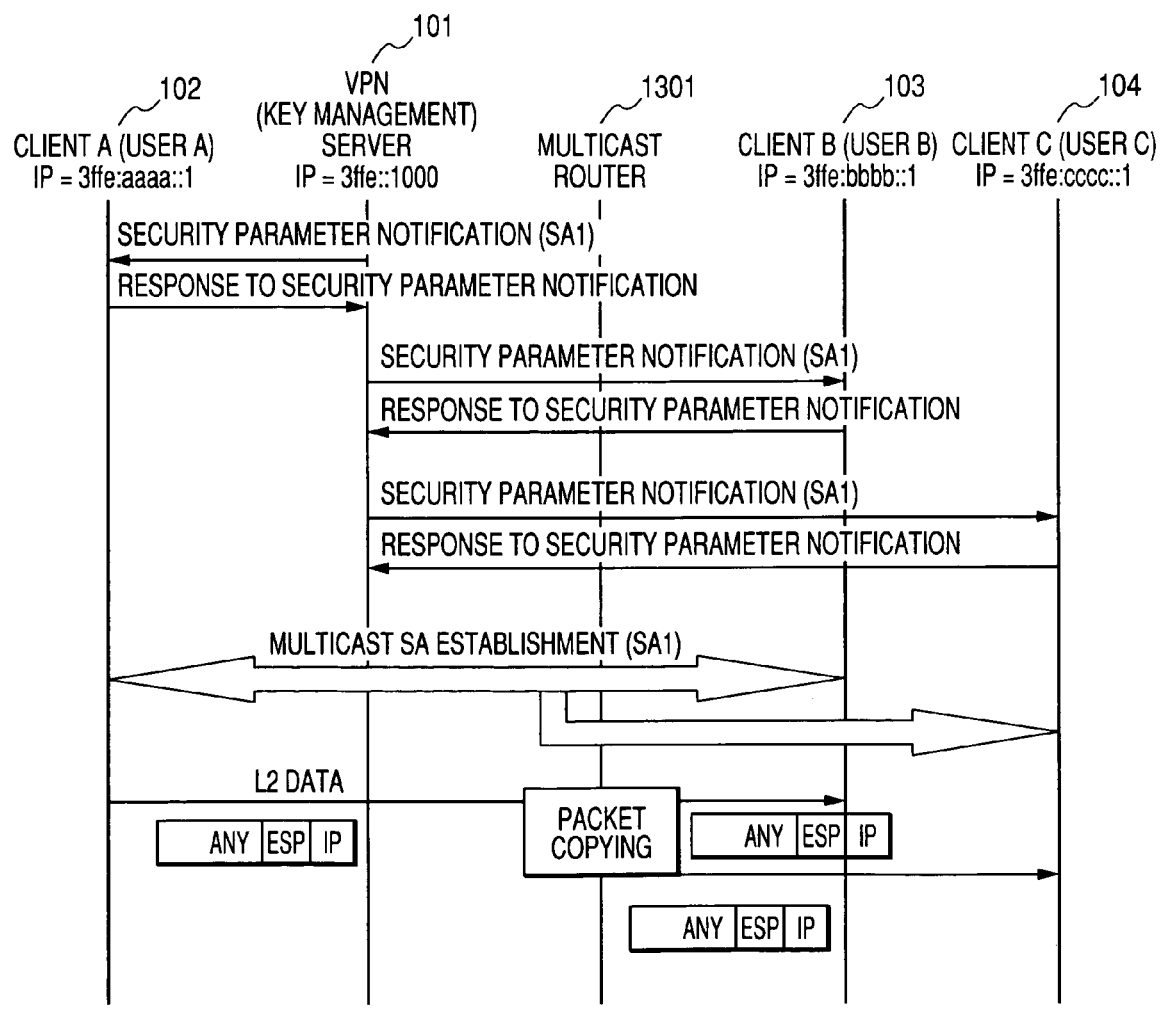
FIG. 14 is a sequence of how processings are performed according to the present invention in the multicast network.

FIG. 14 shows a communication procedure in this third embodiment. Each of the VPN clients (102 to 104) establishes a unicast security association with the VPN server 101 and the VPN server 101 authorizes each user just like in the first embodiment. If a user is authorized, the VPN server 101 notifies the VPN client of the multicast address used for the VPN connection and the multicast security association to establish the security association with the VPN group.

The VPN client A102 captures ether frames sent from the terminal (1) 108 and encrypts the IP packets in the processings (in steps 801 to 806) just like in the first embodiment. In this third embodiment, the VPN client A102 sets none of the VPN header 901 and the IP header addressed to the VPN server 101 to output the IP packet to a communication line. In other words, the VPN server 101 uses an internal IP address as an IP packet address to be sent out. The IP packet to be sent to the multicast address is copied by the multicast router 1301 provided in the multicast network 1302, then sent to the VPN clients B103 and C104. Receiving the multicast IP packet from the VPN client A102, the VPN client decrypts the IP packet with the security association, then subjects the decrypted IP packet to the same processes (steps 812 to 820) as those in the first embodiment.

As described above, the configuration in the third embodiment can thus form a virtual private network using a multicast network without using any VPN server for transfer ether frames, thereby the VPN server's processing load is reduced and the through-put is improved.

Fourth Embodiment

Figure 15:
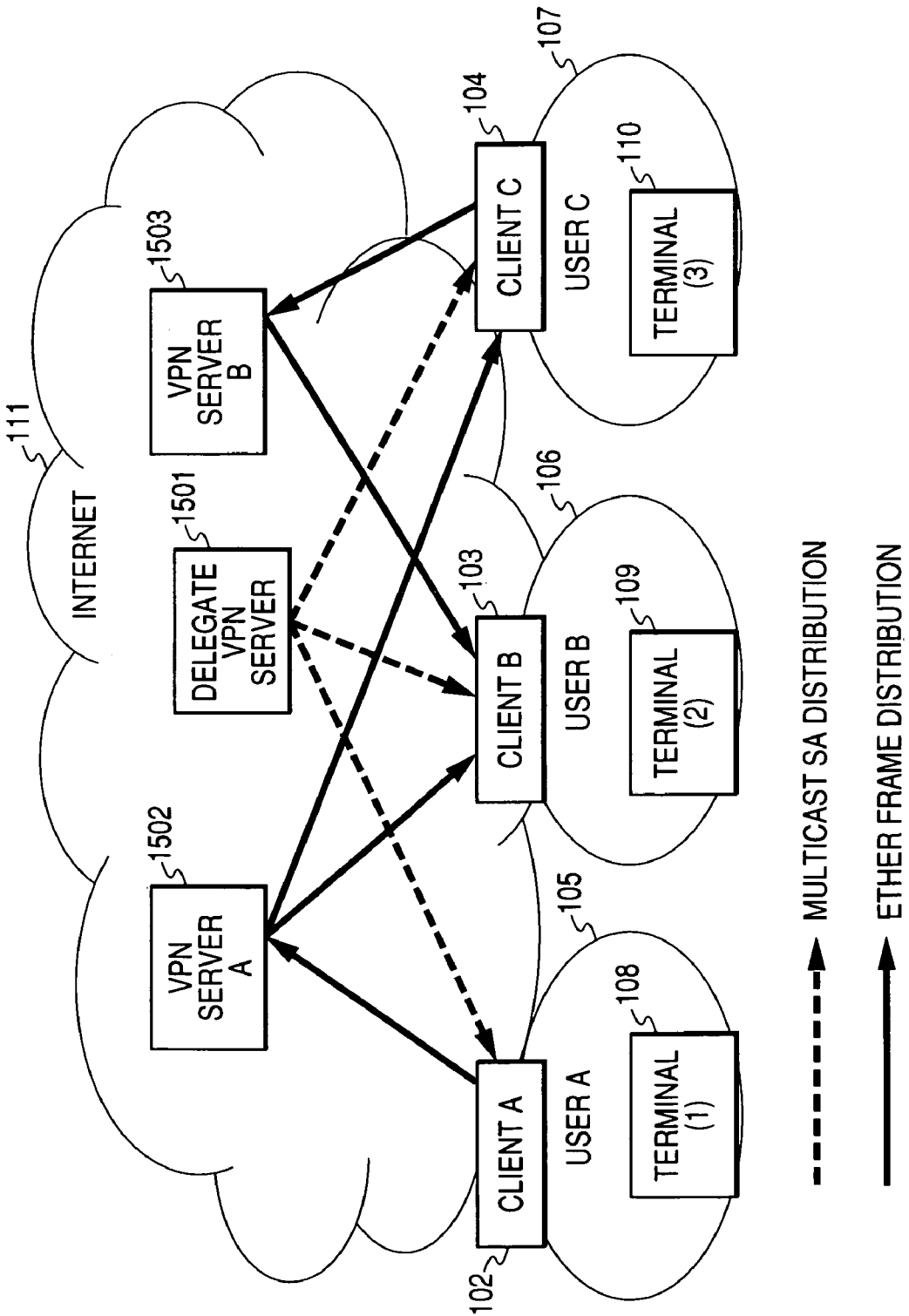
FIG. 15 is a conceptual diagram of a network through which processings are performed according to the present invention with use of a plurality of VPN servers.

FIG. 15 shows how processings are performed according to the present invention using a plurality of VPN servers. In this fourth embodiment, a plurality of VPN servers are connected to the Internet 111 and each VPN client is connected to the nearest VPN server, thereby the VPN client is connected to other VPN clients. In this fourth embodiment, the VPN clients A102, B103, C104, a delegate VPN server 1501, and VPN servers A1502 and B1503 are connected to each another through the Internet 111.

Figure 16:
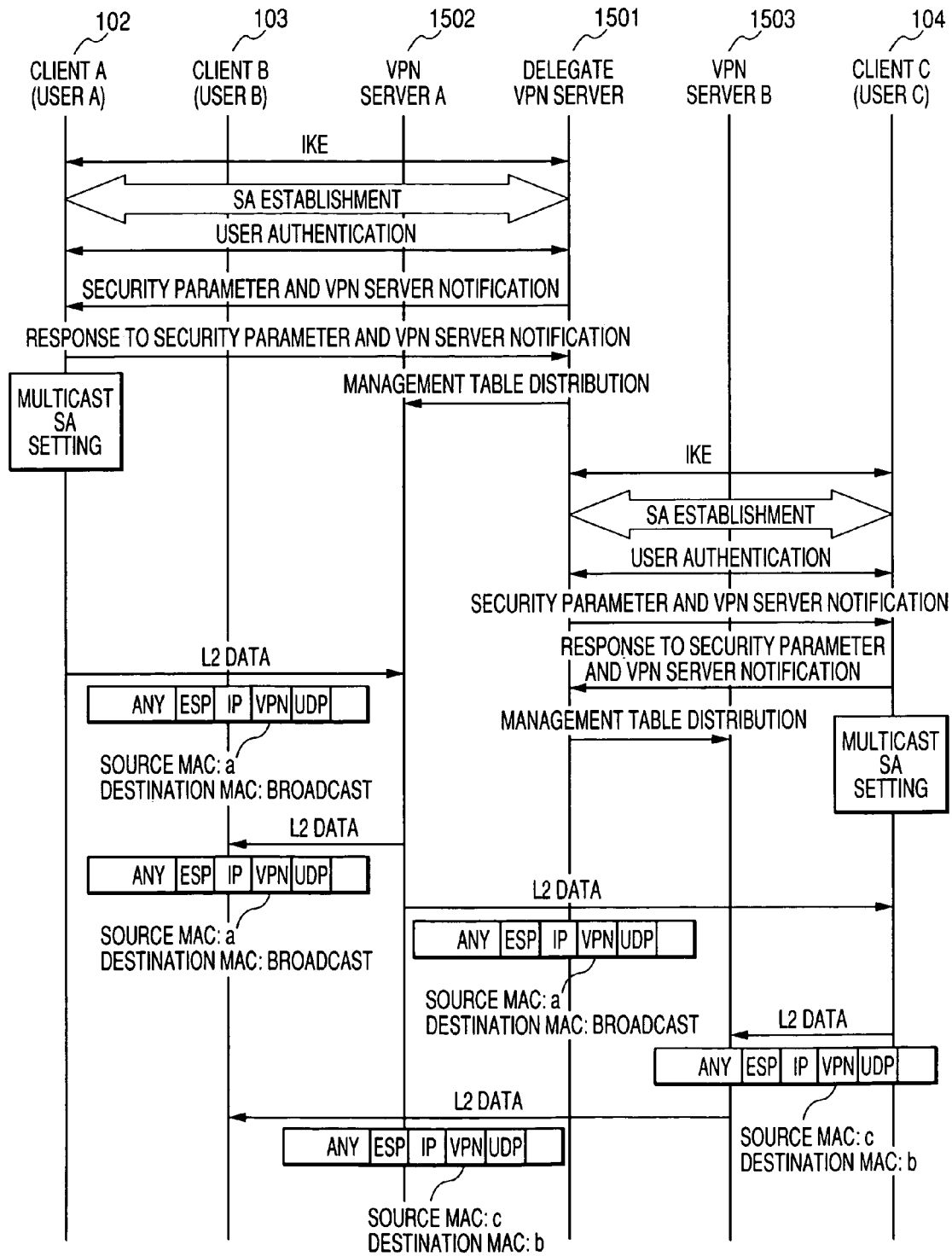
FIG. 16 is a sequence of processings performed according to the present invention with use of a plurality of VPN servers.

FIG. 16 shows a communication procedure employed in this fourth embodiment. Each of the VPN clients (102 to 104) establishes a unicast security association with the delegate VPN server 1501 just like in the first embodiment and the delegate VPN server 1501 executes the user VPN management processing 511 to distribute the multicast address used for the VPN connection and the multicast security association. Hereinafter, the delegate VPN server 1501 distributes the VPN server address used to transfer L2 data to each VPN client. For example, if the VPN client A102 is authorized by the delegate VPN server 1501, the delegate VPN server 1501 notifies the VPN client A102 of the multicast address used for VPN connection and the multicast address security association.

Similarly, each of other VPN clients obtains the nearest VPN server address respectively. The delegate VPN server 1501, when completing the user VPN management processing 511, distributes both of the multicast address management table 508 and the unicast group management table 507 required for VPN transfer to the VPN server 1502 that includes the VPN client A102. Instead of the above distribution, only the portions of the tables 507 and 508, which are updated when the VPN is connected, may be distributed at that time. Hereinafter, the processings for the VPN servers A1502 and B1503 to transfer L2 data received from the VPN clients A102, B103, and C104 may be the same as those in the first embodiment.

As described above, the configuration in the fourth embodiment can thus form a VPN without decrypting and encrypting each internal IP packet in each VPN server even in a network having a plurality of VPN servers and distributes the transfer load of each packet flowing in each VPN using a plurality of VPN servers.

Fifth Embodiment

Figure 17:
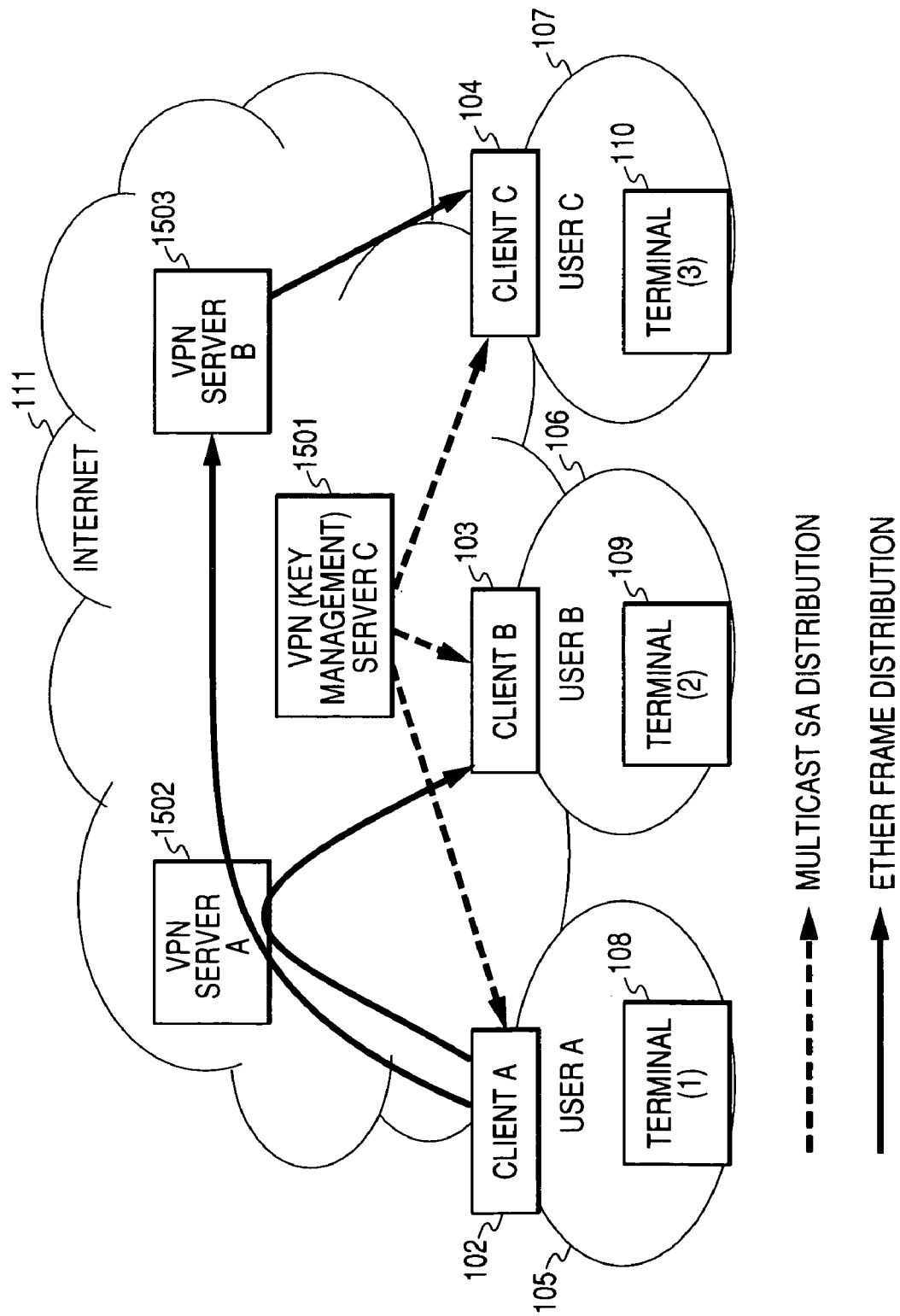
FIG. 17 is a conceptual diagram of a network through which processings are performed according to the present invention through a plurality of VPN servers.

FIG. 17 shows how processings are performed according to the present invention with use of a plurality of VPN servers. In this fifth embodiment, a plurality of VPN servers are connected to the Internet 111 and each VPN client is connected to its nearest VPN server, thereby it is connected to other VPN clients. In this fifth embodiment, the VPN clients A102, B103, and C104, as well as a delegate VPN server 1501 and VPN servers A1502 and B1503 are connected to each another through the Internet 111.

Figure 18:
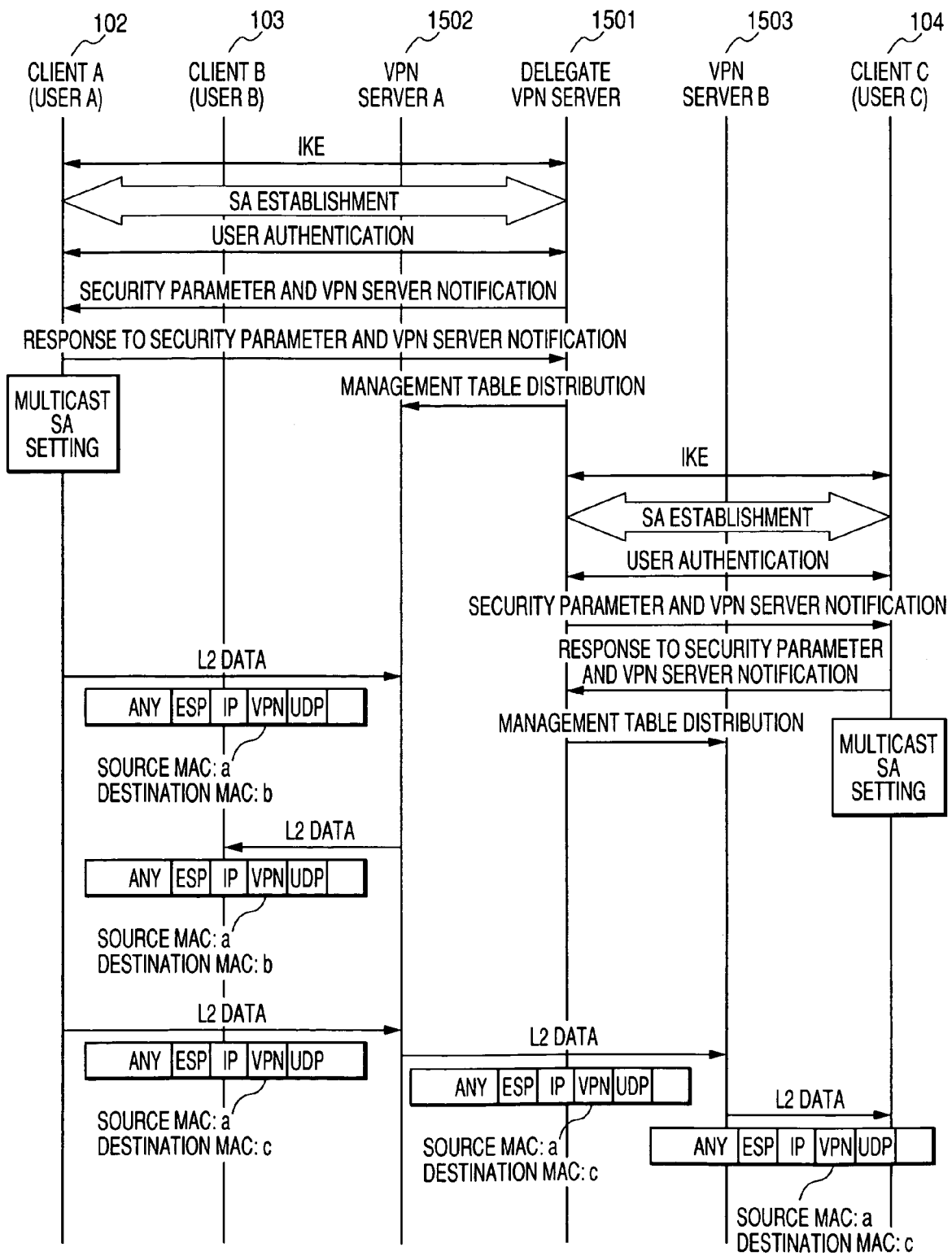
FIG. 18 is a sequence of how processings are performed according to the present invention through a plurality of VPN servers.

FIG. 18 shows a communication procedure in this fifth embodiment. Each of the VPN clients (102 to 104) establishes a unicast security association with the delegate VPN server 1501 just like in the third embodiment and the delegate VPN server 1501 authorizes each user and distributes the multicast address used for VPN connection, the multicast address security association, and the VPN server address to each VPN client. After that, the delegate VPN server 1501 executes the user VPN management processing, then distributes both of the multicast address management table 508 and the unicast group management table 507 required for VPN transfer to the VPN server 1502 that includes the client A102.

In this fifth embodiment, when the delegate VPN server 1501 distributes the unicast group management table 507 to the VPN servers 1502 and 1503, the delegates VPN server 1501 changes the unicast address other than that of the VPN clients included in the VPN server to the unicast address of the VPN server that includes the object VPN client. FIG. 19 shows a conceptual diagram of the unicast group management table 507 distributed to the VPN server B1502 from the delegate VPN server 1501 in this fifth embodiment. And, because the VPN clients A102 and B103 are included in the VPN server A1502, the VPN server A's address "3ffe::1000:a" is set instead of each VPN client unicast address.

Instead of the above distribution, only the portions of the tables 508 and 507, which are updated when the subject VPN client is connected, may be distributed. Hereinafter, the processings for the VPN servers A1502 and B1503 to transfer L2 data received from the VPN clients A102, B103, and C104 are the same as those in the first embodiment.

As described above, the configuration in the above fifth embodiment thus enables each VPN server to transfer IP packets addressed to any VPN client included in another VPN server through a VPN server that includes the destination VPN client without sending those IP packets directly to the VPN client, thereby the VPN server is not required to manage the addresses of VPN clients of another VPN server.

What is claimed is:

1. A server connected to a plurality of VPN client devices through a network, having a memory and a sending/receiving part,
   wherein said memory stores an address common to said plurality of VPN client devices and encrypting information common to said plurality of VPN client devices, said common address and said common encrypting information being paired,
   wherein said sending/receiving part sends said common address and said common encrypting information that are paired to said plurality of VPN client devices, and
   wherein one of said plurality of VPN client devices, when receiving an IP packet that is encrypted according to said encrypting information and has said common address from said sending/receiving part, transfers said encrypted IP packet to a VPN client device other than said one of said plurality of VPN client devices as is.

2. The server according to claim 1,
   wherein said server changes said encrypting information for notifying a VPN client device belonging to a new VPN group if the configuration of a VPN group formed in said plurality of VPN client devices is changed.

3. The server according to claim 1,
   wherein said common address of said plurality of VPN client devices is a multicast address.

4. The server according to claim 1,
   wherein said encrypting information is security association generated for each common address of said plurality of VPN client devices.

5. The server according to claim 1,
   said encrypting information is at least any one of an encrypting algorithm, a key, and a security parameter index generated for each common address of said plurality of VPN client devices.

* * * * *

UNITED STATES PATENT AND TRADEMARK OFFICE
CERTIFICATE OF CORRECTION

PATENT NO. : 7,725,707 B2  Page 1 of 1
APPLICATION NO. : 11/047772
DATED : May 25, 2010
INVENTOR(S) : Yamada et al.

It is certified that error appears in the above-identified patent and that said Letters Patent is hereby corrected as shown below:

On the Title Page, Under Item (30) Foreign Document Priority Data., please delete

"2004-083021"

and add:

"2004-283021"

Signed and Sealed this

Twenty-sixth Day of October, 2010

David J. Kappos
*Director of the United States Patent and Trademark Office*